(12) United States Patent
Aneder

(10) Patent No.: US 11,635,163 B2
(45) Date of Patent: Apr. 25, 2023

(54) HYDRAULIC COMPONENT WITH A COMPONENT HOUSING AND A CONNECTION BLOCK

(71) Applicant: HAWE Hydraulik SE, Aschheim (DE)

(72) Inventor: Georg Aneder, Emmering (DE)

(73) Assignee: HAWE Hydraulik SE, Aschheim (DE)

( * ) Notice: Subject to any disclaimer, the term of this patent is extended or adjusted under 35 U.S.C. 154(b) by 410 days.

(21) Appl. No.: 16/823,957

(22) Filed: Mar. 19, 2020

(65) Prior Publication Data

US 2020/0318769 A1  Oct. 8, 2020

(30) Foreign Application Priority Data

Apr. 8, 2019  (DE) .................. 10 2019 205 032.8

(51) Int. Cl.
*F16L 41/12* (2006.01)
*F16L 41/08* (2006.01)
*F15B 13/04* (2006.01)

(52) U.S. Cl.
CPC .......... *F16L 41/12* (2013.01); *F15B 13/0401* (2013.01); *F16L 41/088* (2013.01)

(58) Field of Classification Search
CPC ......... F16L 41/12; F16L 41/088; F16L 41/03; F16L 41/18; F16L 41/065; F16L 41/045
USPC ..................................... 285/124.5
See application file for complete search history.

(56) References Cited

U.S. PATENT DOCUMENTS

| | | | |
|---|---|---|---|
| 3,559,687 A | 2/1971 | Aslan | |
| 3,688,797 A | 9/1972 | Sorenson | |
| 3,750,247 A * | 8/1973 | Demi | F16L 41/12 29/890.141 |
| 3,758,138 A * | 9/1973 | Roseman | F16L 41/088 285/305 |
| 4,364,406 A * | 12/1982 | Bohlin | F16L 41/045 137/15.13 |
| 4,529,214 A | 7/1985 | Stoll et al. | |
| 5,197,568 A | 3/1993 | Horttonen | |
| 7,789,056 B2 | 9/2010 | Yoshijima et al. | |

(Continued)

FOREIGN PATENT DOCUMENTS

| | | | |
|---|---|---|---|
| DE | 102004018680 A1 | 10/2005 | |
| DE | 202019104774 U1 * | 10/2019 | .............. F16L 41/03 |

(Continued)

OTHER PUBLICATIONS

German Office Action with machine-generated English translation for application No. DE 10 2019 205 032.8, dated Mar. 24, 2020.

*Primary Examiner* — Matthew Troutman
*Assistant Examiner* — Fannie C Kee
(74) *Attorney, Agent, or Firm* — Dinsmore & Shohl LLP

(57) ABSTRACT

A hydraulic component includes a component housing and a connection block. The component housing has an outer surface and an axial bore. At least one connecting channel extends from the outer surface to the axial bore. The connection block has a housing side with at least one connection bore, where the connection bore is in fluidic connection with the at least one connection channel. The outer surface of the component housing has a non-planar shape at least in the area of the at least one connecting channel, where at least one connecting bushing with a through hole is received in the at least one connecting channel and extends into the at least one connection bore.

11 Claims, 5 Drawing Sheets

(56) References Cited

U.S. PATENT DOCUMENTS

| | | | |
|---|---|---|---|
| 9,303,535 B2 | 4/2016 | Kira et al. | |
| 2015/0375981 A1* | 12/2015 | Knieling | F16L 41/03 141/144 |
| 2016/0319805 A1* | 11/2016 | Dille | F16L 41/03 |
| 2017/0219144 A1* | 8/2017 | Petrou | F16L 27/0804 |
| 2017/0370480 A1* | 12/2017 | Witkowski | F16L 41/03 |

FOREIGN PATENT DOCUMENTS

| | | | |
|---|---|---|---|
| EP | 0134185 A2 | 3/1985 | |
| GB | 1404440 A | 8/1975 | |
| GB | 2178139 A | 2/1987 | |
| JP | S5341817 A | 4/1978 | |
| JP | H09178073 A | 7/1997 | |
| JP | 2006200390 A | 8/2006 | |
| JP | 2011241893 A | 12/2011 | |
| JP | 5447987 B2 | 3/2014 | |
| JP | 2018204652 A | 12/2018 | |
| WO | 2018163415 A1 | 9/2018 | |
| WO | WO-2019138388 A1 * | 7/2019 | F16L 41/03 |

* cited by examiner

HYDRAULIC COMPONENT WITH A COMPONENT HOUSING AND A CONNECTION BLOCK

CROSS-REFERENCE TO RELATED APPLICATION

This application claims priority from German Application No. 10 2019 205 032.8 filed Apr. 8, 2019, the entire content of which is incorporated herein by reference.

FIELD OF THE INVENTION

The present invention concerns a hydraulic component with a component housing and a connection block.

BACKGROUND OF THE INVENTION

Such hydraulic components are known from the prior art. The component housing in general has an outer surface and an axial bore, with at least one connecting channel extending from the outer surface to the axial bore. The connection block has a housing side with at least one connection bore, whereby the connection bore is in fluidic connection with the at least one connection channel. The axial bore configured so that pistons, such as spool pistons or seat elements, can be movably arranged in it. These pistons are then used to connect or block different channels, such as the connecting channel. Such hydraulic components can therefore be hydraulic valves.

A problem with such hydraulic components is always the connection between the component housing and the connection block. Particularly in high-pressure hydraulic applications with pressures of several hundred bar, it must be ensured that the fluidic connection between the connecting bore of the connection block and the connecting channel of the component housing is tight.

This is achieved, for example, by the fact that both the outer surface of the component housing in the area of the connecting channel and the housing side of the connection block in the area of the connecting bore are largely planar and rest on each other. This requires a very high degree of accuracy in the production of the parts, which increases the overall costs. This also sets limits with regard to the possible geometries of the component housing and the connection block. It must also be ensured that the fastening forces are sufficiently high to ensure tightness. These high fastening forces can lead to tensions within the parts. In order to ensure that the axial bore in particular is not affected by these stresses, the parts must be designed accordingly solid. This in turn increases both cost and weight.

SUMMARY OF THE INVENTION

It is therefore the object of the present invention to provide a hydraulic component which can be manufactured simply and inexpensively, whereby no tensions in the component housing occur.

The problem is solved by the features according to embodiments of the present invention.

The hydraulic component according to the invention is characterized over the known hydraulic components in that the outer surface of the component housing has a non-planar shape at least in the area of the at least one connecting channel, and at least one connecting bushing with a through hole is received in the at least one connecting channel and extends into the at least one connecting bore.

In other words, the outer surface in the area of the connecting bore has a convex, concave, curved, rounded or even cylindrical shape when viewed in cross-section. The connecting bushing provides the fluidic connection between the connecting channel and the connecting bore and it is not necessary for the outer surface to lie flat on the housing side of the connection block and strong fastening forces are not required. Due to the through hole of the connecting bushing, a fluidic connection can be established between the connecting channel and the connecting bore. Preferably, the through hole is a central bore which passes completely axially through the connecting bushing.

Preferably, the component housing has a substantially cylindrical shape. This means that the component housing can be manufactured particularly easily as a turned part. A substantially cylindrical shape is understood here to be a circular cylindrical shape, whereby certain deviations may exist, for example due to the connecting channel or receiving portions for fastening means or the like.

Preferably, the housing side of the connection block has a substantially planar surface. This means that the connection block can be manufactured particularly easily, for example as a machined cast part or as a milled part.

Preferably, the at least one connecting bushing is axially movable relative to the connecting channel and the connecting bore. Due to the axial mobility of the connecting bushing, production-related tolerances can be compensated to a certain extent, for example.

Preferably, at least a first seal member is disposed in a radial direction between an inner circumferential surface of the connecting channel and a first outer circumferential surface of the connecting bushing. The first seal member ensures that hydraulic fluid does not flow past the side of the through hole and unintentionally exits from the connecting channel.

Preferably, at least one second seal member is disposed in a radial direction between an inner peripheral surface of the connecting bore and a second outer peripheral surface of the connecting bushing. The second seal member ensures that hydraulic fluid does not flow past the side of the through hole and unintentionally exits from the connection hole.

In this regard, the first seal member is preferably an O-ring. Furthermore, the second seal member is preferably also an O-ring. O-rings are low-cost standard parts that enable good sealing. Furthermore, the O-rings also allow the connecting bushing to move axially in relation to the connecting channel and the connecting bore.

Preferably, the component housing is received in at least one first clamp, the at least one first clamp being fixed to the connection block. The first clamp allows the component housing to be easily fixed to the connection block without excessive fixing forces causing stresses in the component housing.

In this regard, a gap is preferably provided between the outer surface of the component housing and the housing side of the connection block. The gap prevents the component housing from resting on the connection block due to manufacturing tolerances, which could lead to stresses in the component housing.

Preferably, the component housing has a first clamp portion and a first stop at a first axial end, whereby the first clamp is disposed in the first clamp portion and abuts against the first stop. This allows the clamp to be easily attached to the component housing in the desired position.

Preferably, the hydraulic component has a second clamp fixed to the connection block, the component housing having a second clamp portion and a second stop at a second axial end, the second clamp being disposed in the second clamp portion and abutting the second stop. This ensures a particularly stable fixing of the component housing on the connection block. In addition, the axial position of the component housing relative to the connection block is also clearly defined.

BRIEF DESCRIPTION OF THE DRAWINGS the following, the invention is explained in more detail by means of an embodiment shown in the figures, wherein schematically:

DETAILED DESCRIPTION OF THE INVENTION

Figure 1:
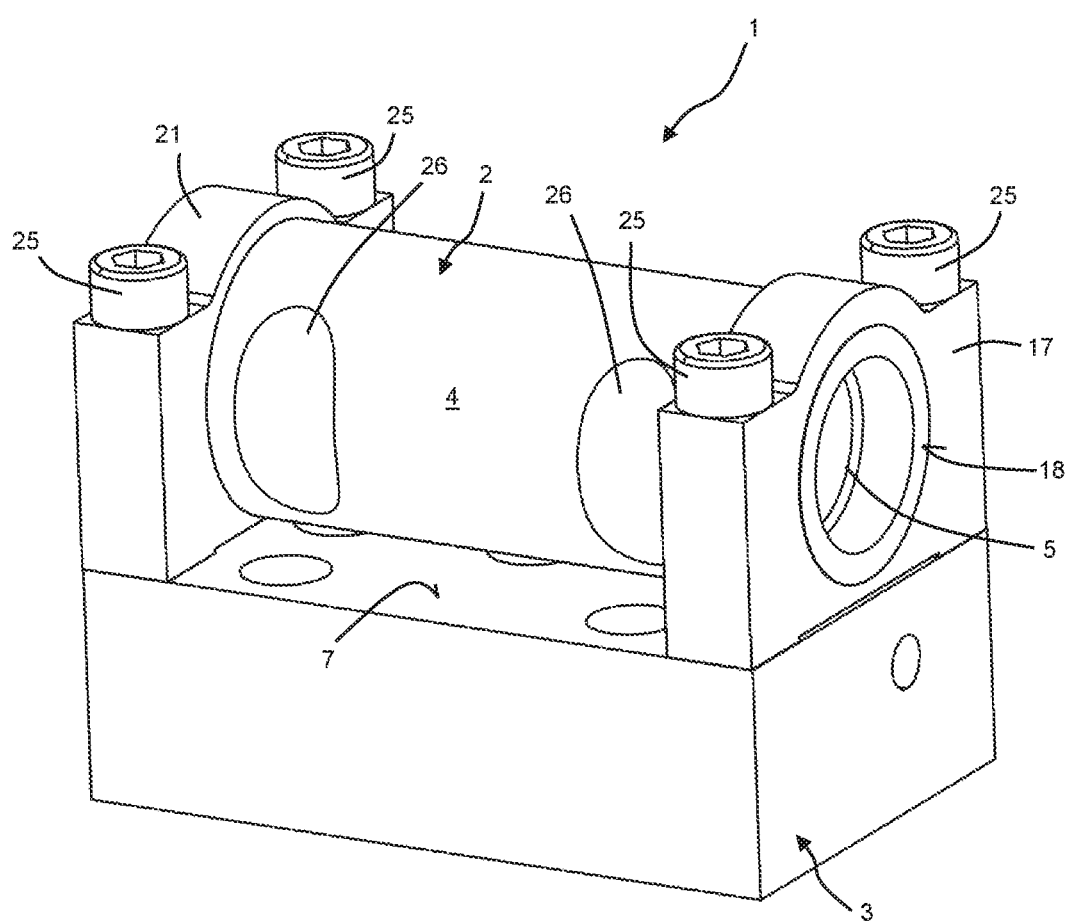
FIG. 1 is a perspective view of a hydraulic component according to the invention.
Figure 2:
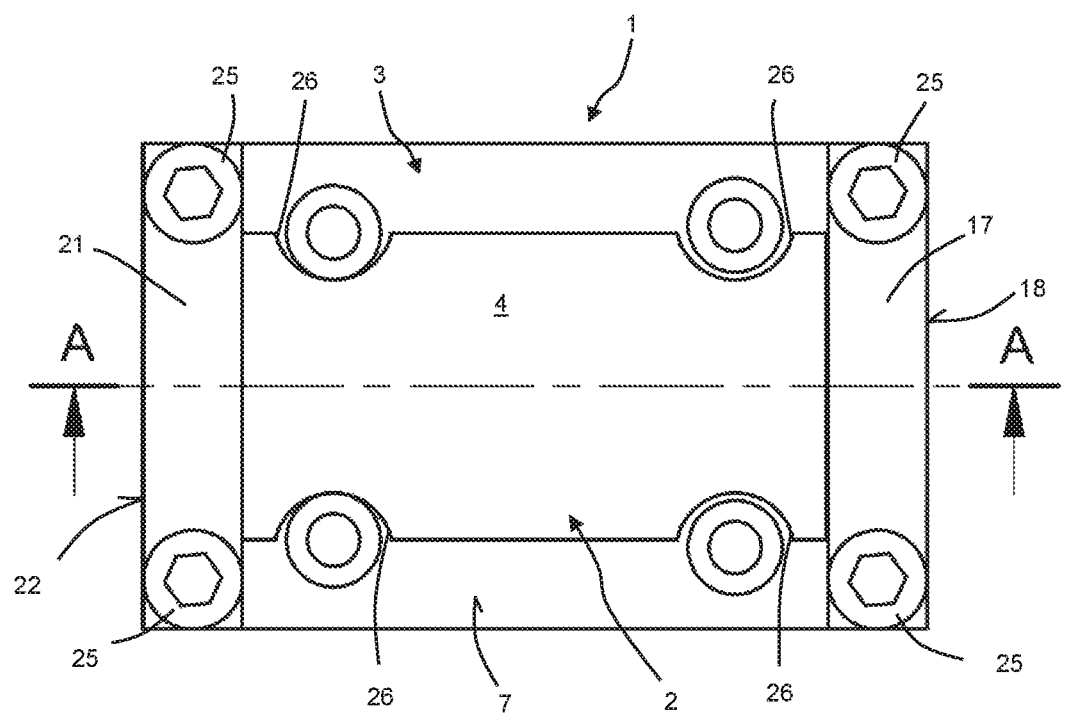
FIG. 2 is a top view of the hydraulic component shown in FIG. 1.
Figure 4:
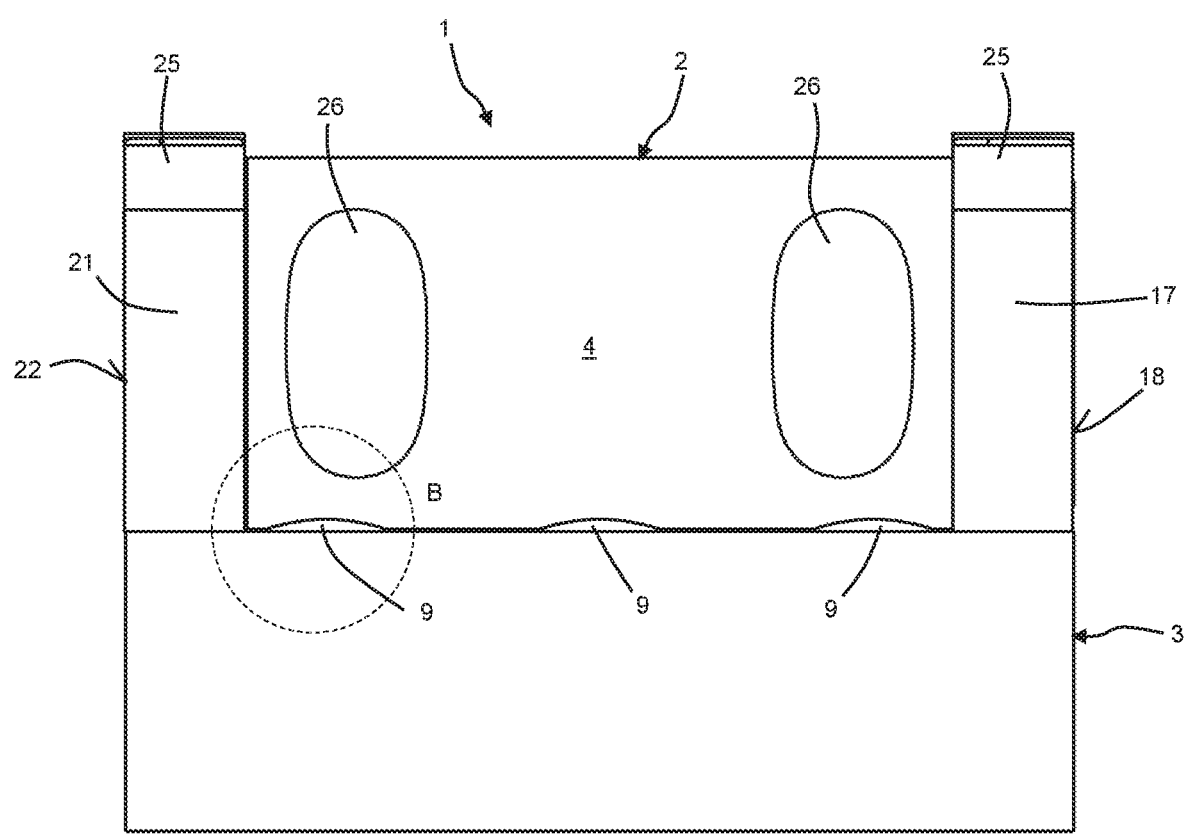
FIG. 4 is a side view of the hydraulic component shown in FIG. 1.

FIGS. 1, 2 and 4 show a hydraulic component 1 according to the invention. The hydraulic component 1 has a component housing 2, which is fixed to a connection block 3 by means of a first clamp 17 and a second clamp 21. The component housing 2 has a cylindrical shape with an outer surface 4 and a central axial bore 5. In the exemplary embodiment, the axial bore 5 is configured to receive (not shown) valve pistons. Connection block 3 has a housing side 7 with a planar surface to which the component housing 2 is fixed.

Figure 3:
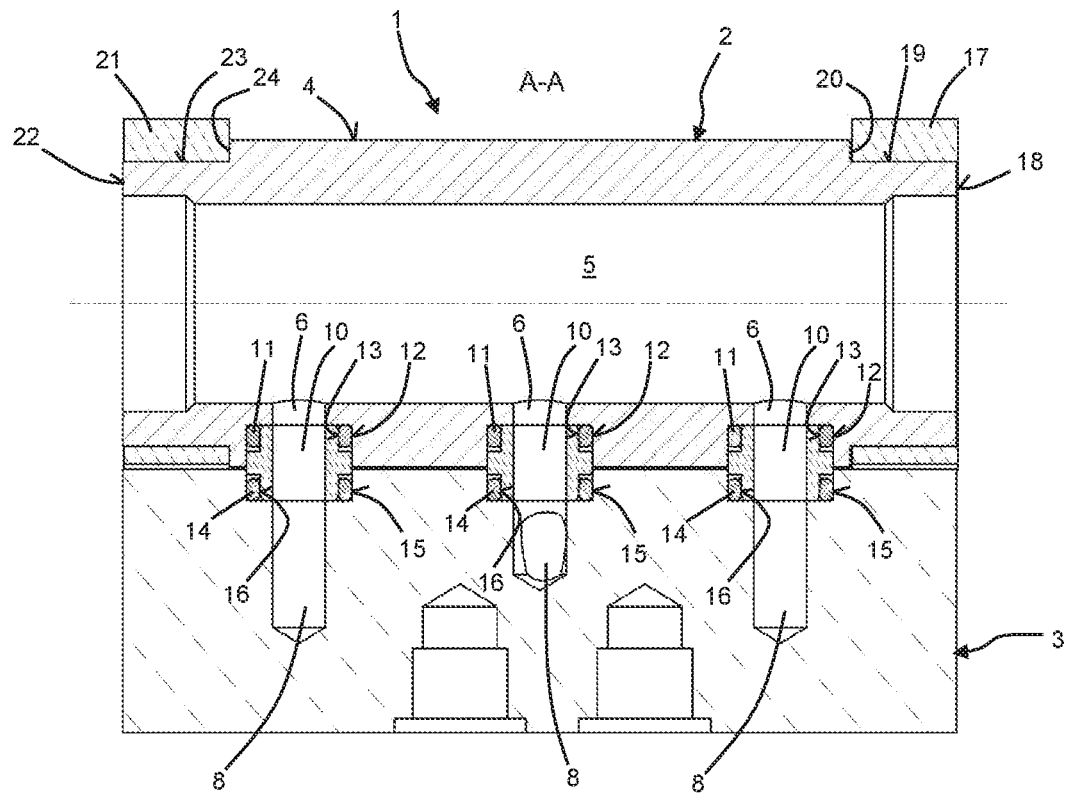
FIG. 3 is a cross section along the line A-A shown in FIG. 2.
Figure 6:
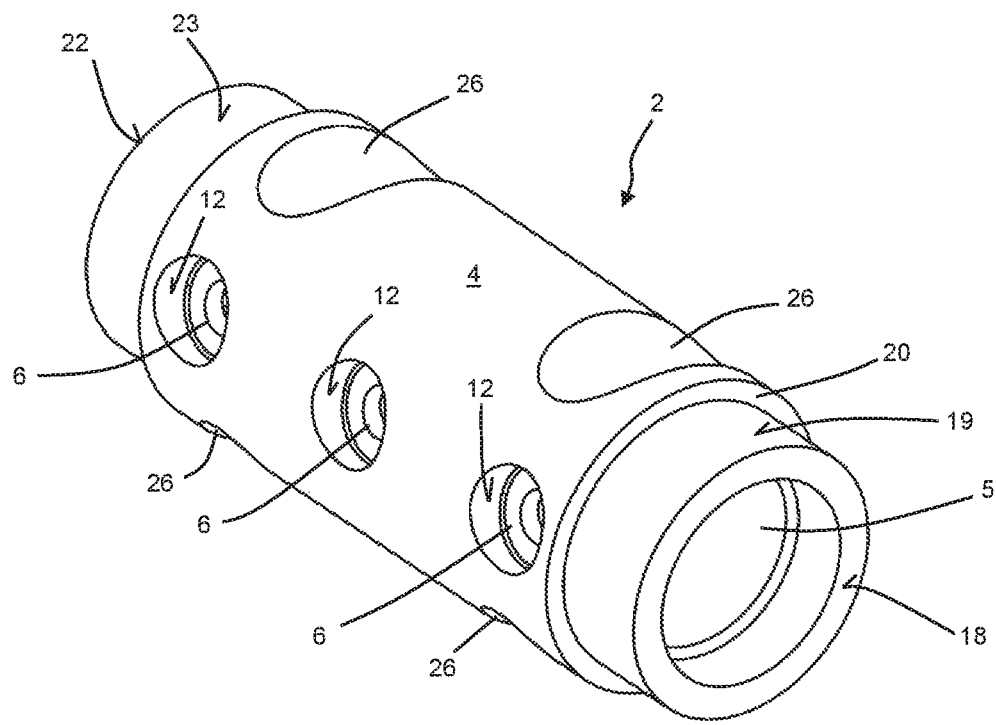
FIG. 6 is a perspective view of a component housing.

As shown in FIG. 3 and FIG. 6, the component housing 2 has at least one connecting channel 6, which extends from the outer surface 4 to the axial bore 5. In exemplary embodiment shown, a total of three connecting channels 6 are shown, whereby the number of connecting channels 6 depends on the intended functionality of hydraulic component 1. As can be seen in particular in FIG. 6, the connecting channels 6 are configured as stepped bores, each to accommodate a connecting bushing 9, which will be described in more detail below.

Figure 8:
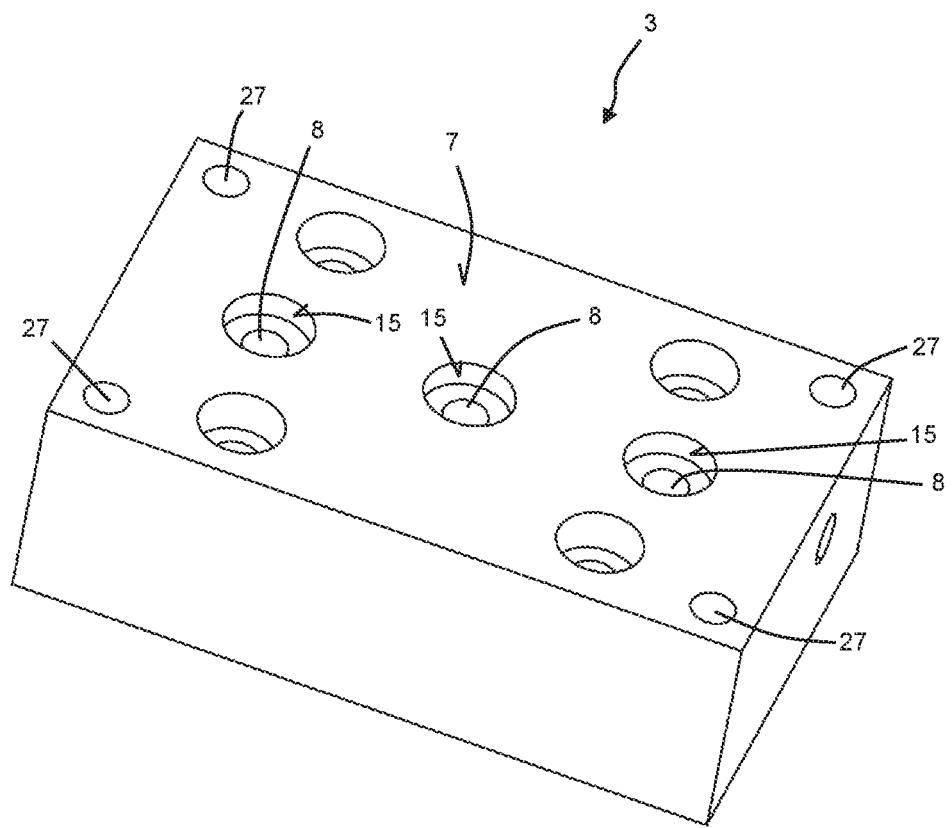
FIG. 8 is a perspective view of a connection block.

The connection block 3 has at least one connection bore 8, which extends from the housing side 7 into the connection block 3, see FIG. 3 and FIG. 8. The number of connection bores 8 corresponds to the number of connection channels 6, so that a total of three connection bores 8 are provided in the exemplary embodiment. As shown in FIG. 8, the connecting bores 8 are also configured as stepped bores to each accommodate one of the connecting bushings 9. The connection bores 8 represent, for example, a P connection, a T connection and a hydraulic consumer connection.

Figure 7:
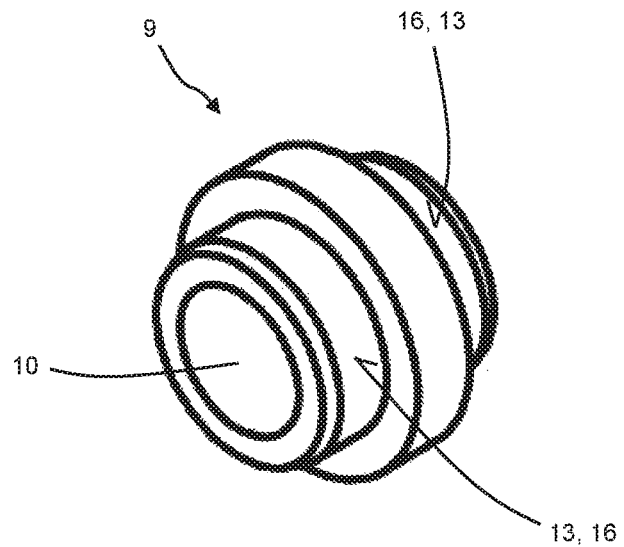
FIG. 7 is a perspective view of a connecting bushing.

One connecting bushing 9 is received in each connecting channel 6. The respective connecting bushing 9 enables a fluidic connection between the respective connecting channel 6 and the respective connecting bore 8. In the following, only one connecting bushing 9, as shown in FIG. 7, will be described, whereby the explanations of course apply to all connecting bushings 9.

For fluidic connection, the connecting bushing 9 has a central through hole 10. To ensure tightness, a first seal member 11 in the form of an O-ring is arranged in the radial direction between an inner peripheral surface 12 of the connecting channel 6 (see also FIG. 6) and a first outer peripheral surface 13 of the connecting bushing 9. A second seal member 14 in the form of an O-ring is arranged in the radial direction between an inner circumferential surface 15 of the connecting bore 8 (see also FIG. 8) and a second outer circumferential surface 16 of the connecting bushing 9. When the connecting bushing 9 is received in the connecting channel 6 and the connecting bore 8 together with the first seal member 11 and the second seal member 14, a tight fluidic connection is ensured between the axial bore 5 of the component housing 2 and the connection block 3, although the outer surface 4 of the component housing 2 has a non-planar shape in the area of the connecting channel 6. As shown in FIGS. 1 and 6, the component housing 2 is substantially cylindrical, so that the outer surface 4 in the area of the connecting bores 6 has the shape of a cylinder section, i.e. is curved or arcuated.

In order to compensate for possible smaller misalignments, e.g. due to the manufacturing process, the connecting bushings 9 are axially movable relative to the respective connecting channel 6 or connecting bore 8. The axial movement of the respective connecting bushing 9 is limited by the respective step of the connecting channel 6 or the connecting bore 8. Due to the radial arrangement of the first seal member 11 and the second seal member 14, there is no impairment of the tightness despite the axial mobility of the connecting bushings 9.

As mentioned above, the component housing 2 is fixed by a first clamp 17 and a second clamp 21 on the connection block 3. For this purpose, a first clamp portion 19 is provided at a first axial end 18 of the component housing 2. The first clamp portion 19 has a smaller diameter than the remaining outer surface 4, so that a first stop 20 is formed between the first clamp portion 19 and the remaining outer surface 4, see also FIG. 6. The first clamp 17 is disposed in the first clamp portion 19 and abuts against the first stop 20 in the axial direction. Accordingly, a second clamp portion 23 is provided at a second axial end 22 of component housing 2. The second clamp portion 23 has the same diameter as the first clamp portion 19, which is therefore smaller than the diameter of the remaining outer surface 4. Thus, a second stop 24 is formed between the second clamp portion 23 and the remaining outer surface 4. The second clamp 21 is disposed in the second clamp portion 23 and abuts against the second stop 24 in axial direction.

The first clamp 17 and the second clamp 21 are fixed to the connection block 3 by means of a plurality of fastening screws 25—in this exemplary embodiment four fastening screws 25 are provided—by inserting the fastening screws 25 through corresponding through holes in the clamps 17, 21 and screwing them into corresponding fastening holes 27 of the connection block 3. Since the first clamp 17 limits the axial movement of component housing 2 in one axial direction and the second clamp 21 limits the axial movement of component housing 2 in the other axial direction, the relative axial position of component housing 2 to connection block 3 is fixed.

Figure 5:
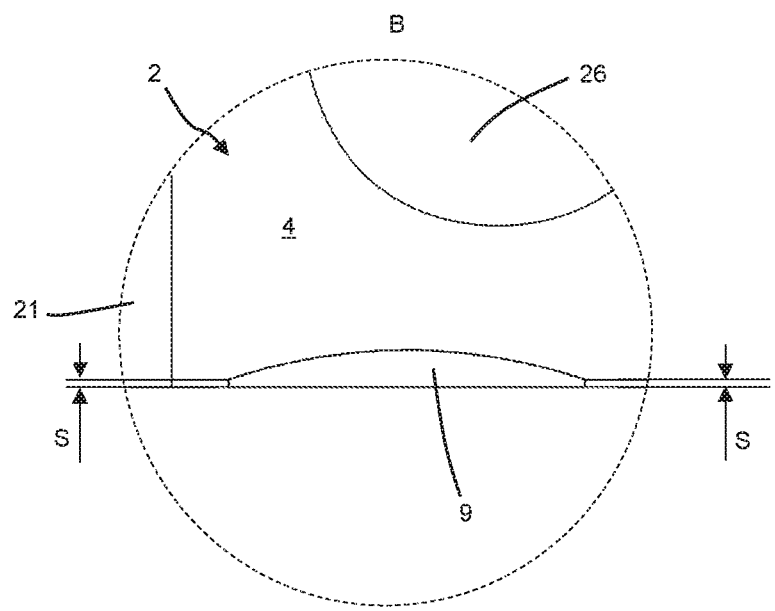
FIG. 5 is an enlarged view of detail B shown in FIG. 4.

As can also be seen from the enlarged representation shown in FIG. 5, a gap S is formed between the outer surface 4 of the component housing 2 and the housing side 7 of the connection block 3 when the component housing 2 is fixed to the connection block 3 via the clamps 17, 21. This gap S prevents stress when fixing the component housing 2 to the connection block 3, as there is no direct contact between the component housing 2 and the connection block 3. A possible misalignment is compensated for by the axial movability of the respective connecting bushing 9.

As can be seen in particular from FIG. 6, the component housing 2 has a substantially cylindrical shape, so that the component housing 2 can be manufactured cost-effectively as a turned part. Only the connecting channels 6 and recesses 26 "interrupt" the cylindrical shape. In this exemplary embodiment, the recesses 26 serve to facilitate installation by allowing (not shown) fixing screws to pass by. Of course, these recesses can be omitted if an alternative mounting is considered.

LIST OF REFERENCE NUMERALS 1 hydraulic component
2 component housing
3 connection block
4 outer surface
5 axial bore
6 connecting channel
7 housing side
8 connecting bore
9 connecting bushing
10 through hole
11 first seal member
12 inner circumferential surface of the connecting channel
13 first outer peripheral surface of the connecting bushing
14 second seal member
15 inner peripheral surface of the connecting bore
16 second outer circumferential surface of the connecting bushing
17 first clamp
18 first axial end of the component housing
19 first clamp portion
20 first stop
21 second clamp
22 second axial end of the component housing
23 second clamp portion
24 second stop
25 fastening screw
26 recess
27 fastening hole
S gap

The invention claimed is:

1. A hydraulic component, comprising:
   a component housing, wherein the component housing has an outer surface and an axial bore, wherein at least one connecting channel extends from the outer surface to the axial bore;
   a connection block, wherein the connection block has a housing side with at least one connecting bore, wherein the at least one connecting bore is in fluidic communication with the at least one connecting channel;
   wherein the outer surface of the component housing has a non-planar shape at least in the area of the at least one connecting channel, wherein at least one connecting bushing with a through hole is received in the at least one connecting channel and extends into the at least one connecting bore; and
   at least one first seal member disposed in a radial direction between an inner peripheral surface of the at least one connecting channel and a first outer peripheral surface of the at least one connecting bushing.

2. The hydraulic component according to claim 1, wherein the component housing has a substantially cylindrical shape.

3. The hydraulic component according to claim 1, wherein the housing side of the connection block has a planar surface.

4. The hydraulic component according to claim 1, wherein the at least one connecting bushing is axially movable relative to the at least one connecting channel and the at least one connecting bore.

5. The hydraulic component according to claim 1, wherein at least one second seal member is disposed in the radial direction between an inner peripheral surface of the at least one connecting bore and a second outer peripheral surface of the at least one connecting bushing.

6. The hydraulic component according to claim 5, wherein the at least one first seal member is an O-ring and/or the at least one second seal member is an O-ring.

7. The hydraulic component according to claim 1, wherein the component housing is received in at least one first clamp, the at least one first clamp being fixed to the connection block.

8. The hydraulic component according to claim 7, wherein a gap is provided between the outer surface of the component housing and the housing side of the connection block.

9. The hydraulic component according to claim 7, wherein the component housing has a first clamp portion and a first stop at a first axial end, the at least one first clamp being disposed in the first clamp portion and abutting against the first stop.

10. The hydraulic component according to claim 9, wherein the hydraulic component has a second clamp fixed to the connection block, the component housing having a second clamp portion and a second stop at a second axial end, the second clamp being disposed in the second clamp portion and abutting against the second stop.

11. A hydraulic component, comprising:
    a component housing, wherein the component housing has an outer surface and an axial bore, wherein at least one connecting channel extends from the outer surface to the axial bore; and
    a connection block, wherein the connection block has a housing side with at least one connecting bore, wherein the at least one connecting bore is in fluidic communication with the at least one connecting channel;
    wherein the outer surface of the component housing has a non-planar shape at least in the area of the at least one connecting channel, wherein at least one connecting bushing with a through hole is received in the at least one connecting channel and extends into the at least one connecting bore; and
    wherein at least one seal member is disposed in a radial direction between an inner peripheral surface of the at least one connecting bore and an outer peripheral surface of the at least one connecting bushing.

\* \* \* \* \*